April 23, 1957　　　　A. V. MOTSINGER　　　　2,789,415
ROTARY-HEAT-ENGINE
Filed April 13, 1950　　　　　　　　　　　　　　2 Sheets-Sheet 1
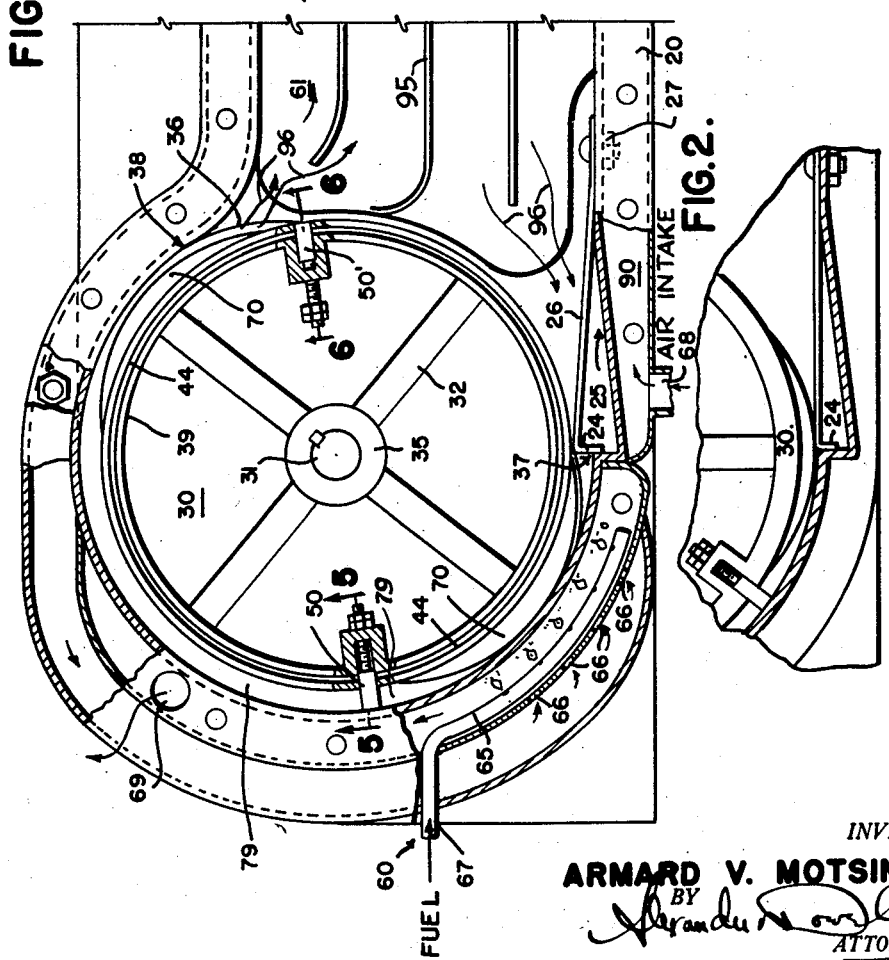
INVENTOR.
ARMARD V. MOTSINGER
BY
ATTORNEYS.

April 23, 1957　　　A. V. MOTSINGER　　　2,789,415
ROTARY-HEAT-ENGINE
Filed April 13, 1950　　　　　　　　　　　　2 Sheets-Sheet 2
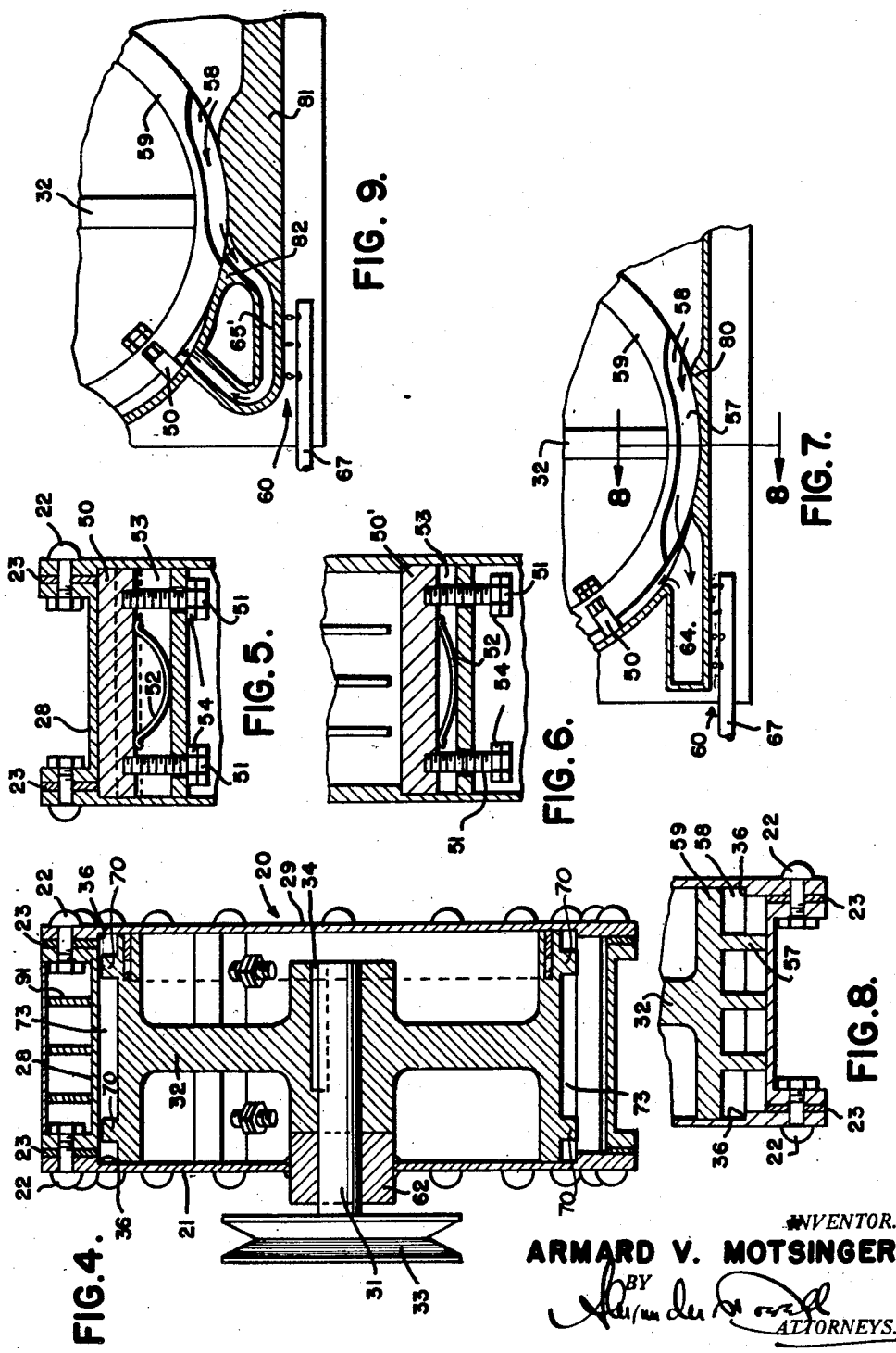
INVENTOR.
ARMARD V. MOTSINGER
BY
ATTORNEYS.

United States Patent Office 2,789,415
Patented Apr. 23, 1957

2,789,415

ROTARY-HEAT-ENGINE

Armard V. Motsinger, Aberdeen, Md.

Application April 13, 1950, Serial No. 155,739

18 Claims. (Cl. 60—24)

The present invention relates to thermal engines and more particularly to an improved closed-circuit, direct thermal engine of a novel rotary type. Thermal engines theoretically having high efficiency have been suggested in the past. As an example, United States Patent Number 1,169,308 of January 25, 1916, to T. Vuia, shows a theoretical design and mathematical treatment of the cycle of a closed circuit thermal engine using reciprocating pistons. As another example U. S. Patent No. 2,157,229 of May 9, 1939, to Vannevar Bush, discloses the principle of a thermal engine applied to a gas compressing apparatus having a higher efficiency than other known types of compressors. Many of the engines embodied various modifications and combinations of reciprocating pistons, regenerators and refrigerators and while some appeared to be theoretically promising, they have in general remained in a commercially undeveloped stage.

The present invention avoids disadvantages of prior suggestions by providing a novel structure that efficiently utilizes the reaction between a revolving and a non-revolving vane. It also avoids the heat losses of internal combustion and other thermal engines where the working fluid is compressed at each cycle.

Accordingly it is a principal object of the present invention to provide a novel and practical rotary thermal engine with a minimum of moving parts.

Another object is to provide a closed-circuit direct thermal engine with simplified heating and cooling means.

Another object is to provide a quiet operating thermal engine capable of developing high torque at low speeds.

Another object is to provide a closed circuit thermal engine with a simplified means for injection and ejection of a working fluid relative to the expansion chamber.

Another object is to provide a thermal engine, in which the rotating member acts as a regenerator to thereby increase the efficiency of the engine.

Another object is to provide in a thermal engine a novel method of using the so-called uniflow principle of steam engines for increased efficiency.

Other objects and many of the advantages will more plainly appear from the detailed specification and drawings presented in exemplification but not in limitation of the present invention. Like reference characters indicate like parts in the accompanying drawings which illustrate diagrammatically in Figure 1, a fragmentary front elevational view with portions broken away to show the rotor at the beginning of a power stroke.

Figure 2, a fragmentary sectional view of the rotor of Figure 1 during an intake cycle.

Figure 3, a fragmentary top plan view with portions broken away to illustrate internal and external cooling fins.

Figure 4, a vertical cross-sectional view taken approximately on the center line of the drive shaft of the rotor of Figure 1 during an intake cycle as shown in Figure 2.

Figure 5, a sectional view taken on the line 5—5 of Figure 1 to illustrate a rotor vane in the closed or out position.

Figure 6, a sectional view taken on the line 6—6 of Figure 1 to illustrate a rotor vane in the open or "use" position.

Figure 7, a fragmentary sectional view illustrating a modified form of the rotor of Figure 1, in which the housing cam is fixed instead of resilient and the working fluid is charged into a heat chamber separate from the expansion chamber.

Figure 8, an enlarged vertical cross-sectional view taken on the line 8—8 of Figure 7.

Figure 9, a fragmentary sectional view illustrating another modified form of the rotor and working fluid intake means of Figure 1, in which the fluid passes through a heat chamber separated from the expansion chamber.

The present invention comprehends a closed housing 20 having sealed therein a rotor 30, and an expansible working fluid 61 occupying said housing and also filling a heat exchanger 40 arranged in cooperating relationship with pressure vanes 50 on the rotor, valve means 24 on the housing, and actuated by an external heat source 60, which for purpose of illustration comprises a gas burner 65, air vents 66 and gas inlet pipe 67.

In Figure 1, a gas heater is illustrated in which compressed air enters tube 68, then passes around the exterior of the engine housing 20 in a counter clockwise direction through ducts 90 absorbing heat from cooling fins 91 shown in Figures 3 and 4, and then enters the combustion chamber through vents 66. The products of combustion exhaust through ports 69, one on either side of the heating chamber adjacent burner 65. The compressed air is simply a means of air supply to cool the cold side of the engine and then circulate around the outside thereof and create an intense fire on the hot side of the engine. It is separate from the working fluid 61 which is sealed inside the housing 20.

The air to be used for combustion thus first circulates around the outside of the housing 20 through ducts between the cooling fins 91, where it removes heat from the cooling fins 91. On the inside of the engine, the working fluid 61 circulates through ducts, or the space between the cooling fins 42. The fins 42 remove heat from the working fluid 61 and transfer it by convection through the wall 28 to the outer fins 91 where it is removed by the circulating air. The heated air is then transferred back to the hot side of the engine. This conserves the heat commonly lost in other engines, as for example, an automobile engine radiator.

In Figure 1 the housing 20 is preferably made of stainless steel on the hot side and of magnesium or aluminum alloy on the cold side. The two sides may be preferably separated by a nickel silver portion to reduce conduction of heat between the two sides. It is also provided with external radiating fins 91 arranged in cooperating relationship with internal fins 42 of heat exchanger 40. A spacer 95 separates the internal fins 42 and divides the heat exchanger into two fluid conduits which guide the fluid through the heat exchanger 40 as shown by the arrows 96.

Thus it may be seen that the said closed circuit confining the working fluid 61 includes the expansion space 79 having an intake end near the valve means 24 and having a discharge end near the point 38, Fig. 1. The fluid conduits of the heat exchanger 40 are folded about the spacer 95 and are separated by the fins 42, and these conduits have a common entrance connecting with the discharge end of the expansion space 79 and a common exit connecting with the intake end of the expansion space. The working fluid 61 circulates in this closed circuit and its circulation is controlled by the valve means 24. The arrows 96 show the paths followed by the fluid 61 in the heat exchanger conduits.

Housing 20 is sealed by gaskets 23, fastening means 22, as shown in Figure 4 engaging front cover 21 and rear cover 29 with web portion 28 so that the expansible working fluid 61 is securely sealed in housing 20.

The rotor end of housing 20 is semi-cylindrical in form and is provided with a zero degree point at 37 and an approximate 225° point at 38. However, if desired, point 38 may be located at 180°, and when only one rotor vane is used may be located at approximately 315° from point 37. The valve means 24 is positioned at point 37 and operates in recess 25. It comprises spring arm portion 26 securely fixed to housing 20 by fastening means 27, and the valve portion 24 is machined to tightly engage rotor 30 and recess 25 to prevent passage of the expansible working fluid therebetween when urged into contact across the face of rotor 30 by spring arm 26. Rotor 30 comprises spokes 32, rim 39, and hub 35 held on shaft 31 by key 34. Shaft 31 rotates in bearing 62 in housing plate 21, and is provided with drive pulley 33 as shown in Figure 4.

The inner peripheral surfaces of plates 21 and 29 are provided with shoulder portions 36 which extend in a complete circle past the points 37 and 38, and act as external cams to actuate rotor vanes 50 and 50'. Each of vanes 50 and 50' is mounted in a recess 53 as shown in Figures 5 and 6 in the periphery of rotor 30, and urged outwardly by spring 52, slidably held in recess 53 by studs 51. Each of vanes 50 and 50' is ground to operate in sliding fluid-tight engagement with plates 21 and 29 and web portion 28. Vanes 50 and 50' may be adjusted to operate a few ten thousandths of an inch from the web portion 28 by means of the nuts 54 on studs 51 to minimize friction.

Vanes 50 and 50' are positioned 180° apart on the rim 39 of rotor 30 which is arranged for clockwise rotation as shown in Figure 1. Positioned to follow each of vanes 50 and 50' are the rotor cams 70 which are formed as a part of rim 39.

Cams 70 are preferably mounted in pairs as shown in Fig. 4, so that fluid space 73 may be provided therebetween.

A modification of the rotor rim is shown in Figures 7 and 8 wherein rim 59 is provided with peripheral recesses 58 in which are positioned radiating fins 57. These fins 57 act as regenerators to store up heat from the expansible working fluid, which heat is added to the fluid as it passes thereby. The radiating fins 57, and rim 39 in Fig. 1 or 59 in Figs. 7 and 9 act as regenerators by taking up heat from the working fluid on the hot side of the engine and giving out this heat on the cold side to the cooled fluid when it is drawn into the expansion chamber. In storing up heat the regenerator acts in reverse from that shown in Figure 7 because part of the hot fluid under some pressure passes through recesses 58 upon ejection and is in contact with the fins 57 during expansion.

An alternate modified form showing the application of heat source 60 is shown in Figure 7 wherein a sealed heat chamber 64 is arranged to receive the cooled expansible working fluid 61 and deliver the heated expansible working fluid as shown by the two arrows in Figure 7 which indicate the path of the cool fluid through recesses 58 between fins 57, on rim 59, and thereafter is carried by inertia into sealed heating chamber 64. Valve means 24 is in this embodiment replaced by fixed cam 80 as shown in Figure 7.

Another modified form of the application of heat source 60 is shown in Figure 9 wherein the rotor is the same as that shown in Figure 7. In Figure 9 the cool expansible working fluid is drawn through recesses 58 on rim 59, and thereafter is forced by suction through heating chamber 65' by action of vanes 50 and 50'. In this embodiment the fixed cam 81 serves instead of fixed cam 80, the extended portion 82 and heating chamber 65'.

*Operation*

In operation, heat from source 60 delivered at points 65 in Figure 1 (or to the exterior of chamber 64 in Figure 7, or the exterior of chamber 65' in Figure 9) rapidly expands the working fluid 61 in the expansion space sealed between valve means 24 and rim 39 at one end and between vane 50 and housing 20 at the other end. This expansion of working fluid 61 violently pushes against vane 50 causing rotor 30 to turn in a clockwise direction on its shaft 31 as shown in Figure 1. This fluid expansion space 79 between valve means 24 and vane 50 remains sealed until vane 50 reaches the point 38 (Fig. 1) which may be located at approximately 180° to 315° from valve means 24 which is then positioned at the zero degree point indicated at point 37. In Figure 1, point 38 is located 225° from point 37. As vane 50 passes point 38 the fluid pressure is released, and the expansible working fluid 61 is expelled into the heat exchanger 40 as shown in Figure 1.

At the moment vane 50 passes point 38, when point 38 is located 180° from point 37, its opposite vane 50' passes point 37 followed by its pair of cams 70 which depress valve means 24 and suck the cool expansible working fluid through space 73 (Fig. 4) between cams 70 where it is immediately heated at points 65 as shown in Figure 1 (or in chamber 64 as shown in Figure 7 or in chamber 65' as shown in Figure 9).

Instantly thereafter cams 70 pass over valve means 24, and spring 26 elevates valve means 24 into sealing engagement with rim 39 and again closing the peripheral expansion space 79 previously described. Thereafter vane 50' reaches point 38, and vane 50 reaches point 37 and is followed by its pair of cams 70, and the cycle hereindescribed is repeated successively driving rotor 30 and drive pulley 33.

The burned gases in moving upward from the burner serve to heat the outside of the expansion space and further to heat the expanding working fluid in the chamber. As the working fluid expands its pressure decreases. The point of ejection is located approximately at the place where the pressure in the expansion chamber is only slightly above that in the heat exchanger. The amount of the working fluid injected into the heating chamber, and the type of fluid used and the heat applied determines the degree of expansion that must be used for highest efficiency and consequently the location of the point 38, where vanes 50 or 50' open to permit ejection into the cooling chamber.

It will be seen that when space 79 reaches its maximum volume that it may provide a power cycle stroke of more than 90° per cycle or 180° per revolution when a two cycle rotor is used as illustrated in Figure 1. When a one cycle rotor is used having only one vane 50, the power stroke may be more than 200° per revolution. The length of the cam 70 is determined by the amount of expansible working fluid 61 to be injected per cycle which is related to the degree of expansion per cycle as previously explained.

In the modification shown in Figure 7 when chamber 58 passes over fixed cam 80, the expansible working fluid is sucked through chamber 58 and into space 79, and when chamber 58 has passed the first contacted edge of cam 80 space 79 is sealed by the fluid-tight engagement of rim 59 with cam 80 at one end and by the fluid-tight engagement of vanes 50 and 50' at the other end of space 79 and housing 20 and at the shoulders 36. The fluid is thrown by inertia into the heating chamber 64. In the modification shown in Figure 9, the operation is the same as that illustrated by Figure 7 except that the injected expansible working fluid is sucked into the heating chamber 65'.

Operating temperatures for the interior of the engine of the present invention are preferably 500° F. on the hot side and 150° F. on the cold side. However, higher temperatures may be used on the hot side by the use of expansible working fluids and lubricants which are stable at higher temperatures. Gases such as helium under pressure may be used for expansion on the hot side and contraction on the cool side. Alternately I prefer an expansible working fluid miscible with oil and having a suitable boiling point so that it will vaporize on the hot side and condense on the cool sde. Stable compounds such as high boiling Freon or trichloroethylene, or sulphur dioxide are preferred examples, and even water may be used. Also a gas such as air or helium may be used with a liquid, which will vaporize on the hot side and condense as a fog on the cold side. It is preferred to use a heat stable, organo-silicon oxide polymer as a lubricant, preferably one such as a silicone well known as silicone DC 710 fluid.

The heat source may be a gas flame as shown at 60; or an electric unit, or a gasolene or oil burner. If desired a water jacket may also be provided for heat exchanger 40 under extremely hot outside operating temperatures. Heat exchanger 40 is designed primarily to be air cooled so that part of the heat loss on the cold side will be transferred to heat the hot side as previously explained.

Inasmuch as several modifications have been revealed herein; and as various other embodiments will obviously occur to those skilled in the art; therefore all modifications and embodiments are contemplated that are within the spirit and scope of the present invention as defined in the appended claims, wherein it is claimed:

1. A rotary heat engine driven by a thermally expansible working fluid in a closed circuit comprising a sealed housing having a cavity therein; a rotor journaled in said cavity; the periphery of the cavity being radially spaced from the rotor partway around its periphery to define a peripheral fluid-expansion space, and being graduated to a sliding fit against the rotor for the remainder of the periphery; a heat exchanger for cooling the working fluid, said heat exchanger having a fluid conduit connected with the intake and discharge ends of said fluid-expansion space to complete said closed circuit, and said heat exchanger having a first jacket around said conduit through which air is passed; heating means adjacent the peripheral fluid-expansion portion of the cavity; spaced radially disposed vanes resiliently mounted in the periphery of said rotor and adapted to contact the periphery of said cavity; and valve means at the intake end of said fluid expansion space and operated by said rotor to admit said expansible working fluid from said conduit into said peripheral space behind each vane as it passes said valve means.

2. In an engine as set forth in claim 1, said housing having a second jacket adjacent said peripheral expansion space, and said heating means comprising a fuel burner in said second jacket, the second jacket having an air intake at one end and an air exhaust at the other end; and said housing having an air passage adjacent said second jacket and connected with the air intake thereof and with said first jacket to supply preheated air from the first jacket to the burner in the second jacket.

3. In an engine as set forth in claim 2, a supply of compressed air entering said first jacket around said conduit, and being conducted through said air passage and into said second jacket to said fuel burner.

4. In an engine as set forth in claim 1, radially disposed vane-receiving pockets in the periphery of said rotor, said pockets having holes in the inner ends thereof; studs on said vanes passing through said holes; spring means yieldably urging said vanes outwardly of said pockets; and nuts on said studs to limit the outward travel of said vanes whereby the latter may be adjusted to just barely graze the periphery of the cavity when within said fluid-expansion space.

5. A rotary heat engine driven by a thermally expansible working fluid in a closed circuit comprising a sealed housing having a cavity therein; a power take-off shaft journaled through said cavity; a rotor on said shaft in said cavity, the periphery of the cavity being radially spaced from the rotor partway around its periphery to define a peripheral fluid-expansion space, and being graduated to a sliding fit against the rotor for the remainder of the periphery; a heat exchanger for cooling the working fluid, said heat exchanger having a fluid conduit connected with the intake and discharge ends of said fluid expansion space adjacent the respective graduated portions between the fluid expansion space and the sliding fit portion of the cavity to complete said closed circuit, and said heat exchanger having a first jacket around said conduit through which air is passed; heating means adjacent the peripheral fluid-expansion portion of the cavity; spaced radially disposed vanes resiliently mounted in the periphery of said rotor and adapted to contact the periphery of said cavity; and valve means at the intake end of said fluid expansion space and operated by said rotor to admit said expansible working fluid from said conduit into said peripheral space, behind each vane as it passes said valve means.

6. In an engine as set forth in claim 5, said housing having a second jacket adjacent said peripheral expansion space, and said heating means comprising a fuel burner in said second jacket, the second jacket having an air intake at one end and an air exhaust at the other end; and said housing having an air passage adjacent said second jacket and connected with the air intake thereof and with said first jacket to supply preheated air from the first jacket to the burner in the second jacket.

7. In an engine as set forth in claim 6, a supply of compressed air entering said first jacket around said conduit, and being conducted through said air passage and into said second jacket to said fuel burner.

8. In an engine as set forth in claim 5, radially disposed vane receiving pockets in the periphery of said rotor; said pockets having holes in the inner ends thereof; studs on said vanes passing through said holes; spring means yieldably urging said vanes outwardly of said pockets; and nuts on said studs to limit the outward travel of said vanes whereby the latter may be adjusted to just barely graze the periphery of the cavity when within said fluid-expansion space.

9. A rotary heat engine driven by a thermally expansible working fluid in a closed circuit comprising a sealed housing having a cavity therein; a rotor journaled in said cavity, the periphery of the cavity being radially spaced from the rotor partway around its periphery to define a peripheral fluid-expansion space, and being graduated to a sliding fit against the rotor for the remainder of the periphery; a heat exchanger for cooling the working fluid, said heat exchanger having a fluid conduit connected with the intake and discharge ends of said fluid-expansion space to complete said closed circuit, and said heat exchanger having a first jacket around said conduit through which air is passed; heating means adjacent the peripheral expansion portion of the cavity; spaced radially disposed vanes resiliently mounted in the periphery of said rotor and adapted to contact the periphery of said cavity; and valve means at the intake end of said fluid expansion space and operated by said rotor to admit said expansible working fluid from said conduit into said peripheral space behind each vane as it passes said valve means; said valve means comprising a resilient flap normally contacting the rotor periphery across said intake end to close the latter; and a cam on the rotor periphery behind each of said vanes to displace said flap from said intake end.

10. In an engine as set forth in claim 9, said housing having a second jacket adjacent said peripheral expansion space, and said heating means comprising a fuel burner in said second jacket, the second jacket having an air intake at one end and an air exhaust at the other end; and said housing having an air passage adjacent said second jacket and connected with the air intake thereof and with said first jacket to supply preheated air from the first jacket to the burner in the second jacket.

11. In an engine as set forth in claim 9, radially disposed vane receiving pockets in the periphery of said rotor, said pockets having holes in the inner ends thereof; studs on said vanes passing through said holes; spring means yieldably urging said vanes outwardly of said pockets; and nuts on said studs to limit the outward travel of said vanes whereby the latter may be adjusted to just barely graze the periphery of the cavity when within said fluid-expansion space.

12. A rotary heat engine driven by a thermally expansible working fluid in a closed circuit comprising a sealed housing having a cavity therein; a rotor journaled in said cavity, the periphery of the cavity being radially spaced from the rotor partway around its periphery to define a peripheral fluid-expansion space, and being graduated to a sliding fit against the rotor for the remainder of the periphery; a heat exchanger for cooling the working fluid, said heat exchanger having a fluid conduit connected with the intake and discharge ends of said fluid-expansion space to complete said closed circuit, and said heat exchanger having a first jacket around said conduit through which air is passed; heating means adjacent the peripheral fluid-expansion portion of the cavity; spaced radially disposed vanes resiliently mounted in the periphery of said rotor and adapted to contact the periphery of said cavity; and valve means at the intake end of said fluid expansion space and operated by said rotor to admit said expansible working fluid from said conduit into said peripheral space behind each vane as it passes said valve means; said valve means comprising a first duct normally dead-ending against said rotor, and a second duct in said rotor behind each vane adapted to register with said first duct to admit said expansible working fluid therefrom to a point behind its associated vane.

13. In an engine as set forth in claim 12, said housing having a second jacket adjacent said peripheral expansion space, and said heating means comprising a fuel burner in said second jacket, the second jacket having an air intake at one end and an air exhaust at the other end; and said housing having an air passage adjacent said second jacket and connected with the air intake thereof and with said first jacket to supply preheated air from the first jacket to the burner in the second jacket.

14. In an engine as set forth in claim 12, radially disposed vane receiving pockets in the periphery of said rotor, said pockets having holes in the inner ends thereof; studs on said vanes passing through said holes; spring means yieldably urging said vanes outwardly of said pockets; and nuts on said studs to limit the outward travel of said vanes whereby the latter may be adjusted to just barely graze the periphery of the cavity when within said fluid-expansion space.

15. A rotary heat engine driven by a thermally expansible working fluid in a closed circuit comprising a sealed housing having a cavity therein; a rotor journaled in said cavity, the periphery of the cavity being radially spaced from the rotor partway around its periphery to define a peripheral fluid-expansion space, and being graduated to a sliding fit against the rotor for the remainder of the periphery; a heat exchanger for cooling the working fluid, said heat exchanger having a fluid conduit connected with the intake and discharge ends of said fluid-expansion space to complete said closed circuit, and said heat exchanger having a first jacket around said conduit through which air is passed; heating means adjacent the peripheral fluid-expansion portion of the cavity; spaced radially disposed vanes resiliently mounted in the periphery of said rotor and adapted to contact the periphery of said cavity; and valve means at the intake end of said fluid expansion space and operated by said rotor to admit said expansible working fluid from said conduit into said peripheral space behind each vane as it passes said valve means, said valve means comprising a short sealing abutment segregating said conduit from said expansion space, and said rotor having short circumferentially disposed recesses in its periphery behind each vane to by-pass the expansible working fluid past the abutment into the expansion space.

16. In an engine as set forth in claim 15, said housing having a second jacket adjacent said peripheral expansion space, and said heating means comprising a fuel burner in said second jacket, the second jacket having an air intake at one end and an air exhaust at the other end; and said housing having an air passage adjacent said second jacket and connected with the air intake thereof and with said first jacket to supply preheated air from the first jacket to the burner in the second jacket.

17. In an engine as set forth in claim 15, radially disposed vane receiving pockets in the periphery of said rotor, said pockets having holes in the inner ends thereof; studs on said vanes passing through said holes; spring means yieldably urging said vanes outwardly of said pockets; and nuts on said studs to limit the outward travel of said vanes whereby the latter may be adjusted to just barely graze the periphery of the cavity when within said fluid-expansion space.

18. In an engine as set forth in claim 15, a preheating chamber in said housing adapted to receive and heat said expansible working fluid as it passes from said valve means to said expansion space; and means for heating said chamber.

References Cited in the file of this patent

UNITED STATES PATENTS

| 239,955 | Hoffmeister et al. | Apr. 12, 1881 |
|---|---|---|
| 239,832 | Guldner | Nov. 22, 1881 |
| 292,400 | Baldwin | Jan. 22, 1884 |
| 355,634 | Baldwin et al. | Jan. 4, 1887 |
| 389,045 | Bair | Sept. 4, 1888 |
| 762,263 | Cazin | June 7, 1904 |
| 1,032,236 | Patten | July 9, 1912 |
| 1,169,308 | Vuia | Jan. 25, 1916 |
| 1,557,557 | Chaussepied | Oct. 20, 1925 |
| 1,726,462 | Wittig | Aug. 27, 1929 |
| 2,060,728 | Fleischer | Nov. 10, 1936 |
| 2,157,229 | Bush | May 9, 1939 |
| 2,227,129 | Entz | Dec. 31, 1940 |
| 2,240,906 | Harold | May 6, 1941 |
| 2,255,584 | Hubacker | Sept. 9, 1941 |
| 2,301,404 | Holmes | Nov. 10, 1942 |
| 2,398,471 | Short et al. | Apr. 16, 1946 |
| 2,513,692 | Tubbs | July 4, 1950 |

FOREIGN PATENTS

| 13,206 | Great Britain | Sept. 12, 1888 |
|---|---|---|
| 140,172 | Germany | Nov. 23, 1901 |

OTHER REFERENCES

Report on Dimethyl-Silicone-Polymer Fluids published in Transactions of A. S. M. E. for May 1946.